United States Patent [19]

Bates

[11] Patent Number: 5,651,479
[45] Date of Patent: Jul. 29, 1997

[54] MASS FLOW GENERATOR

[76] Inventor: Lyndon Bates, 15 Harewood Avenue, Sale, Cheshire, United Kingdom

[21] Appl. No.: 438,983

[22] Filed: May 11, 1995

[30] Foreign Application Priority Data

May 6, 1995 [GB] United Kingdom ............... 9509285

[51] Int. Cl.$^6$ ...................................... B67D 3/00
[52] U.S. Cl. ........................... 222/196; 222/564
[58] Field of Search ................ 222/185.1, 196, 222/547, 564; 414/287, 288, 293, 297

[56] References Cited

U.S. PATENT DOCUMENTS

| | | | |
|---|---|---|---|
| 1,731,675 | 10/1929 | McCoy | 222/564 X |
| 2,843,274 | 7/1958 | Williams | 222/564 |
| 3,794,386 | 2/1974 | Hite | 222/564 X |
| 3,804,303 | 4/1974 | Fassauer | 222/564 X |
| 3,828,984 | 8/1974 | Gmuer | 222/196 |
| 3,995,541 | 12/1976 | Coyle et al. . | |
| 4,282,988 | 8/1981 | Hulber, Jr. . | |
| 4,346,802 | 8/1982 | Popper . | |
| 4,548,342 | 10/1985 | Fisher | 222/564 X |
| 4,854,722 | 8/1989 | Jackson | 222/564 X |
| 5,181,633 | 1/1993 | Weber et al. . | |

FOREIGN PATENT DOCUMENTS

| | | | |
|---|---|---|---|
| 317490 | 12/1988 | Japan | 222/564 |
| 586058 | 12/1977 | U.S.S.R. | 222/196 |
| 262125 | 5/1927 | United Kingdom . | |
| 370203 | 4/1932 | United Kingdom . | |
| 625503 | 6/1949 | United Kingdom . | |
| 1385734 | 2/1975 | United Kingdom . | |
| 1393288 | 5/1975 | United Kingdom . | |
| 2056296 | 8/1979 | United Kingdom . | |
| 2136407 | 9/1984 | United Kingdom . | |
| 2232964 | 2/1991 | United Kingdom . | |

*Primary Examiner*—Kevin P. Shaver
*Attorney, Agent, or Firm*—Lee, Mann, Smith, McWilliams, Sweeney & Ohlson

[57] ABSTRACT

An insert system for changing the pattern of material flow in a bulk storage hopper during the discharge process, from a form where a channel flow develops within a mass of smile material into a form where the entire stored contents are caused to flow. This change is affected by the provision of insert members supported within the hopper, which modify the stress pattern in the flowing contents to allow the bulk material to deform more readily and for slip to take place on all contact surfaces between the material and the hopper walls.

20 Claims, 7 Drawing Sheets

FIG. 1
FIG. 2
FIG. 3
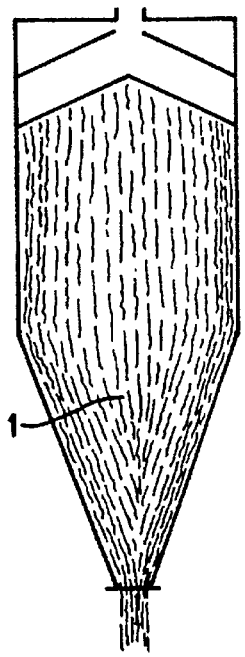
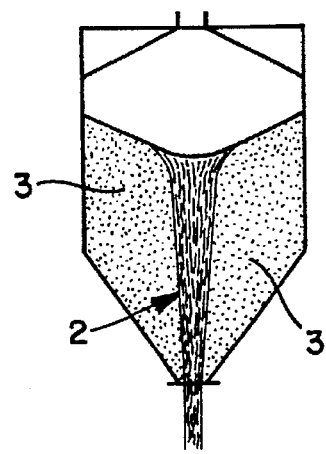
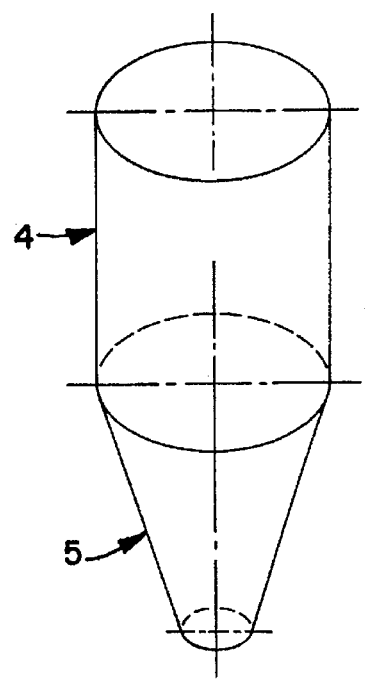
FIG. 4
FIG. 5
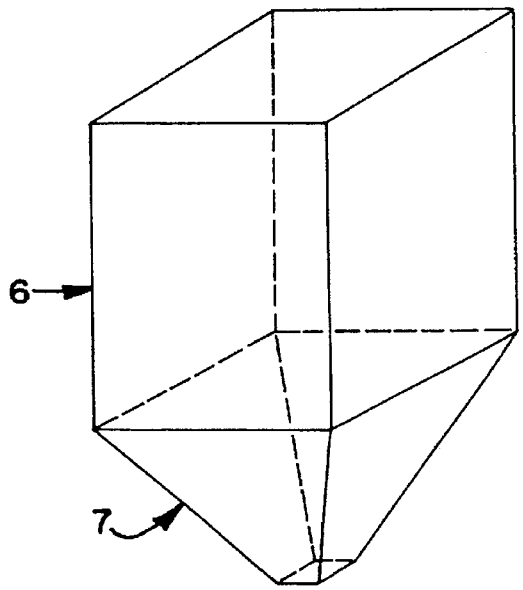
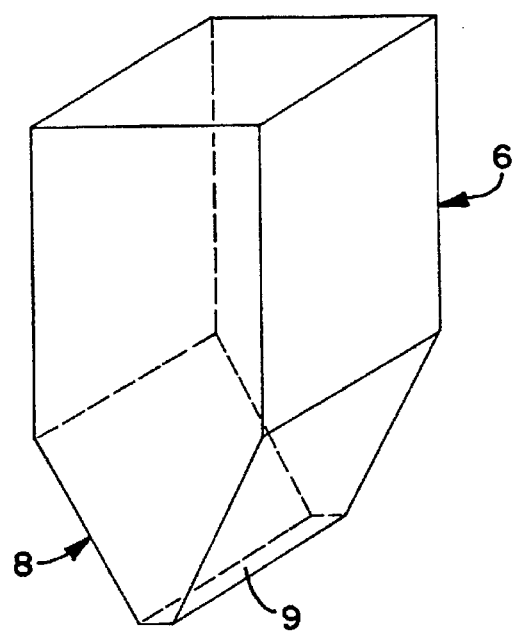

MASS FLOW GENERATOR

BACKGROUND OF THE INVENTION

This application is directed to an insert system for influencing the pattern of material flow in storage containers for bulk solids.

Bulk storage containers, variously referred to as hoppers, silos, bunkers and bins, are widely used for the temporary storage of quantities of loose solids. For the purposes of this application, the term 'hopper' will be used to cover all differing forms of storage containers for loose bulk solids where the material is filled into the top of the container and it moves during the discharge process to an outlet situated in the lower regions of the container.

The manner in which the contents move during the discharging process is essentially characterised by whether all the contents are in motion, termed 'Mass Flow', as shown by the reference numeral 1 in FIG. 1. or whether an internal channel of flow (2) develops within a bed of static material, (3) termed 'Funnel Flow' or 'Core Flow', as shown in FIG. 2.

Storage containers are commonly made in the form of a cylindrical body section (4) fitted with a concentric conical converging section, (5) as shown in FIG. 3. Further common shapes are of rectangular or square cross sections, (6) with either a pyramid shaped base section, (7) as shown in FIG. 4, or a construction with a Vee section (8) converging to an outlet slot, (9) as shown in FIG. 5.

The 'Mass Flow' form of movement of hopper contents offers various operating advantages, but the converging wall surfaces of the container require to be much steeper than is the case with 'Funnel flow' type hoppers. 'Mass Flow' hoppers therefore have the disadvantage of requiring greater headroom in order to store a particular volume of product, or of storing less volume within a limited headroom.

Mass Flow hoppers also require specialised design based upon measured properties of the material to be stored. This expertise and bulk material testing procedure tends to be expensive in relation to the manufacturing cost of many hoppers used in the process industries.

As a consequence most hoppers in service are of the 'Funnel Flow' type. Many of these hoppers experience problems associated with this form of material flow. Any segregation which takes place during filling is not corrected when the material is discharged. Flow stoppages can occur due to the material 'bridging' as a stable mass over the outlet. The discharge may have erratic and/or limited flow rates. The density and behaviour of the product varies when filled into sacks, keg, bins, drums or other containers. 'Flushing' i.e. uncontrolled discharge of the product in a fluid state is also a performance hazard. There is always an indeterminate and extended storage periods for some portion of the contents because the order of discharge is not related to the sequence with which the differing regions of the hopper are filled. This feature may lead to deterioration of the products condition, its flowability or other forms of adverse behaviour.

The invention provides a flow deflecting and shielding system, which influences the flow pattern of bulk material in the hopper, such that all the stored contents move in a Mass Flow manner during the discharge process, in hoppers which have shallower wall angles than those normally required.

The angle of wall inclination required to promote Mass Flow of the hopper contents, is a function of the frictional characteristics of the bulk material on the contact surface of the container wall and of the internal angle of friction of the bulk material. The required angle of wall inclination to promote wall slip in containers of cone and wedge shape construction is described in the technical paper 'Gravity Flow of Bulk Solids', published by A. W. Jenike, Bull 126, University of Utah, 1965.

The mechanism by which bulk materials are held in a firm position against the wall of a container, whilst an internal flow channel develops in the body of the stored material during outflow, is the result of a compound assembly of stresses. In the case of a conical hopper these comprise of three components, respectively generated by:

1. Wall Friction—Resistance to wall slip is mobilised by potential movement of the material relative to the wall (10) as shown in FIG. 6 giving rise to an opposing force (11) parallel to the contact surface, (12) because of the friction of the material against the wall. The magnitude of this resisting force is a function of the interface characteristics between the bulk material and the wall surface, and is proportional to the contact pressure (13) which is acting at 90° to the wall surface. The required wall inclination for Mass Flow is closely related to the wall friction angle of the stored solid sliding on the contact surface of the container walls.

2. Radial Pressure—Radially acting pressure from flowing contents in a central 'core' region of the hopper contents (14), as shown in FIG. 7 acts against the supporting surface of the static bulk material at the flow boundary interface 15. This pressure not only resists the boundary layers moving radially inwards, but also enhances the ultimate outward pressure against the container wall to result in an increase in the wall friction effect.

3. Circumferential Pressure—Resistance to a reduction in the circumferential dimension of material in an outer annular region of a cone shaped hopper is generated by virtue of the bulk material being subject to a compressive 'hoop' stress (16) as shown in FIG. 8 as the material commences to move down within the converging section into a cross section of reduced diameter. The presence of the outer container wall and of material occupying the central region of the cross section provides a state of confinement of the annular bulk, to oppose deformation of this material, and hence its ability to move to the lowers region of the hopper with its smaller cross section.

These components can be considered in detail:

1. Wall Friction.

Changes of the slip characteristics of the bulk material on the wall contact surface influence the hopper geometry required to provide wall slip. Differing surface finishes or materials of construction, wall liner materials and surface coatings are commonly used to improve wall slip. In some eases the condition of the bulk material itself is modified to give better flow characteristics.

This approach has strict limitations, in that the range of suitable materials for construction or lining the wall surfaces are limited by the friction values available, and also by cost and other criteria of use. Surface frictional values are inherent properties of the interface characteristics between the bulk material and the contact surface and lower values may not be achievable. Fixing methods for facing materials may also raise problems of flow, hygiene and the durability of the installed surface.

It is also found that differing materials used for hopper wall construction do not always exhibit similar relationships of frictional values with differing bulk materials. A surface which has a lower value of friction surface than another surface with one bulk material may have a higher frictional value when used with another bulk material, or even with the same material when it has a differing moisture content, temperature or other variant.

There is no ubiquitous 'low friction surface'. Measured values of contact friction are needed to establish optimum contact surface materials for specific products.

2. Radial Pressure.

A prior invention for stimulating mass flow in a hopper, UK Patent No. 2,056,296 B, consists of fitting an inner cone to the hopper. FIG. 9. This inner cone (17) has steep walls to stimulate mass flow of the inner contents (18) and its inner walls sustain the pressure acting radially outwards (19) from this centrally flowing region. Material in the outer annulus (20) is therefore able to deform more easily by virtue of containment of the active radial pressures of the central region of flow. This material in the outer regions of the hopper diameter is thus able to flow and slip on the outer walls at lower inclinations than if the inner cone was not fitted. A characteristic of this system is that the inner and outer regions are essentially separate flow channels where the form of flow in each is dictated by their respective geometries and contact conditions. Each section requires its separate extraction conditions (21), (22) to be satisfied.

3. Circumferential Pressure.

An alternative approach, developed earlier by the applicant, FIG. 10, provides an inclined tubular form of insert (23) to shield the outlet region (24) and direct the extractive flow channel from the outlet (25) to behind the insert. (26) Dilation of the flowing media underneath the insert provides a region of reduced pressure into which the remaining cross section of material (27) may flow in order to reduce in diameter as it moves down within the hopper. This allows the whole contents of the hopper to flow in a mass flow manner. The reduction in circumferential stress provided by this insert permits the material in the hopper cross section to deform more easily, and enables slip to develop on the hopper walls at lower inclinations than if it were not fitted.

Drawbacks of the design methods described above are that they are cumbersome and expensive to manufacture and they are relatively difficult to install, particularly when supplied as retrofits to improve flow in existing hoppers. The forms of insert referred to sustain high structural loads, due to their manner of offering support to the flowing contents.

The invention incorporates features to provide both radial and circumferential stress relief for the contents of conical hoppers in the region of the walls and also cause a reduction of the friction forces opposing slip on the walls by reducing the wall contact pressures. For wedge and pyramid shaped hoppers the invention provides support for flow forces acting outward towards the wall and relief for horizontal forces in the flowing media acting parallel to the walls. Deformation and Mass Flow of the product takes place at lower wall inclinations than with hoppers not fitted with these inserts.

The components described in the invention are more simple to manufacture and fit than the previous inserts described, particularly for installation in existing storage hoppers. They also allow more robust and simpler methods of support, by virtue of their basic design.

SUMMARY OF THE INVENTION

The invention takes the form of an assembly of inserts fixed within a container used for the storage of bulk particulate material. The purpose of these are to modify the flow pattern during the discharge process, from a core channel developed within the bulk of the stored product, to a Mass Flow pattern in which the total contents of the hopper are in motion during the discharge process.

BRIEF DESCRIPTION OF THE DRAWINGS

FIG. 1 is a diagram illustrating Mass Flow of the contents within the hopper.

FIG. 2 is a diagram illustrating Funnel Flow of the contents within a hopper.

FIG. 3 shows a hopper having a conical base.

FIG. 4 shows a hopper having a pyramidal base.

FIG. 5 shows a hopper having a V-shaped base.

DETAILED DESCRIPTION OF THE PREFERRED EMBODIMENT

A specific embodiment of the invention will now be described by way of example with reference to the accompanying drawing:

With the forgoing and other objects hereinafter appearing in view, the features of this invention include the modification of the stress pattern acting within the bulk material within the hopper to allow some local relief from the radially acting stress of material in the central region of the hopper, also to provide relief for the circumferential or transverse stress of the material resting in the outer peripheral regions of the hopper contents and to support in part the stresses acting radially outwards from the flowing material in the central region of the hopper, with corresponding reduction in wall frictional forces.

Figure 6:
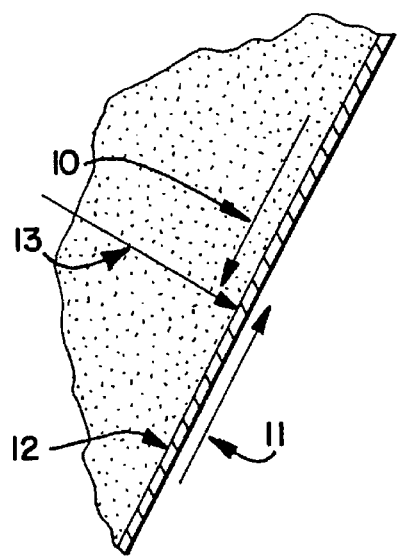
FIG. 6 is a diagram illustrating wall friction forces generated by the contents of a hopper.
Figure 7:
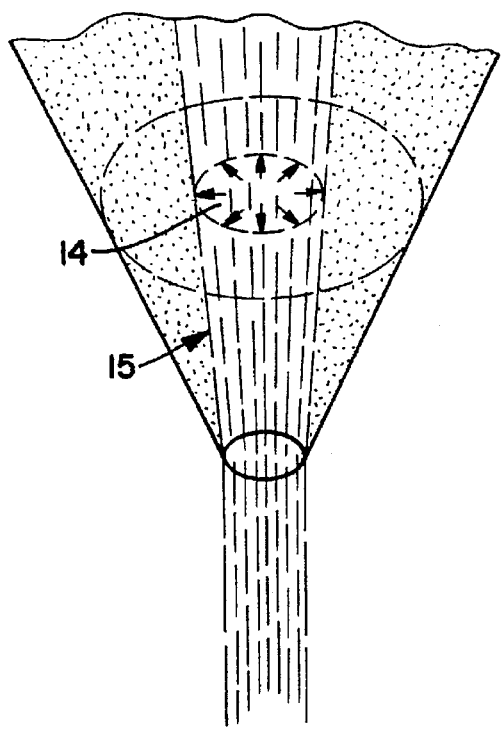
FIG. 7 is a diagram illustrating radial forces generated by the contents of a hopper.
Figure 8:
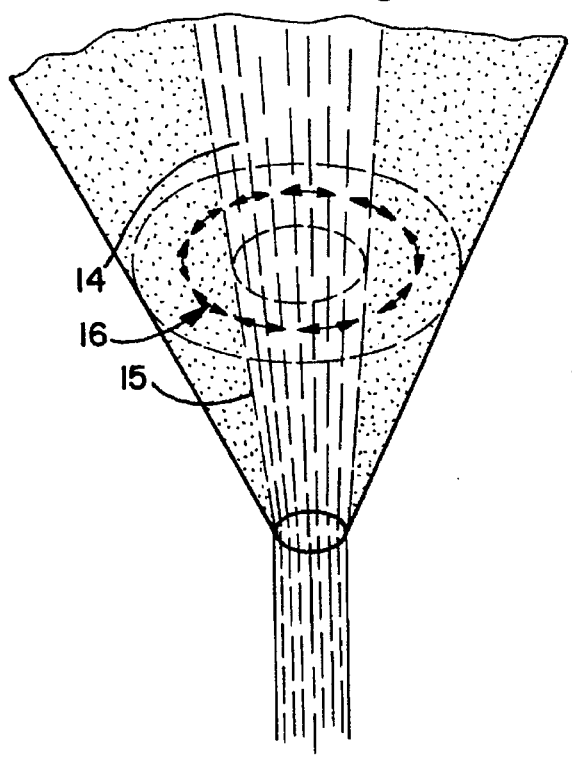
FIG. 8 is a diagram illustrating hoop forces generated by the contents of a hopper.
Figure 9:
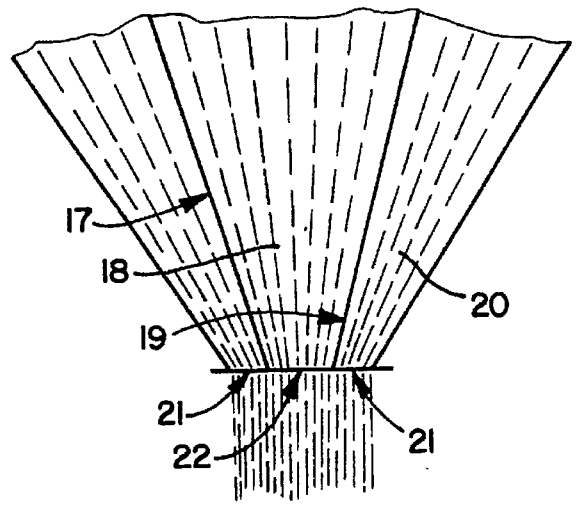
FIG. 9 shows a cone insert within a hopper.
Figure 10:
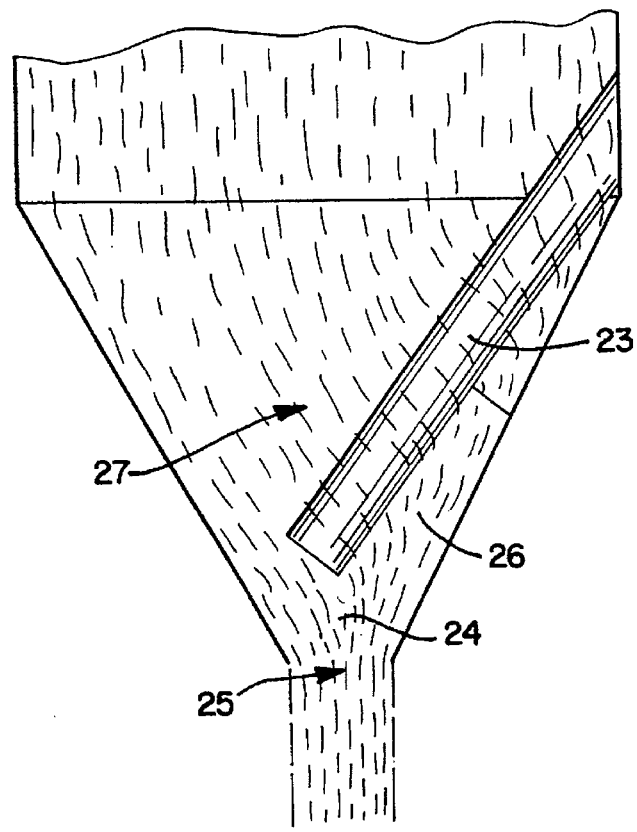
FIG. 10 shows a hopper having a tubular insert.
Figure 11:
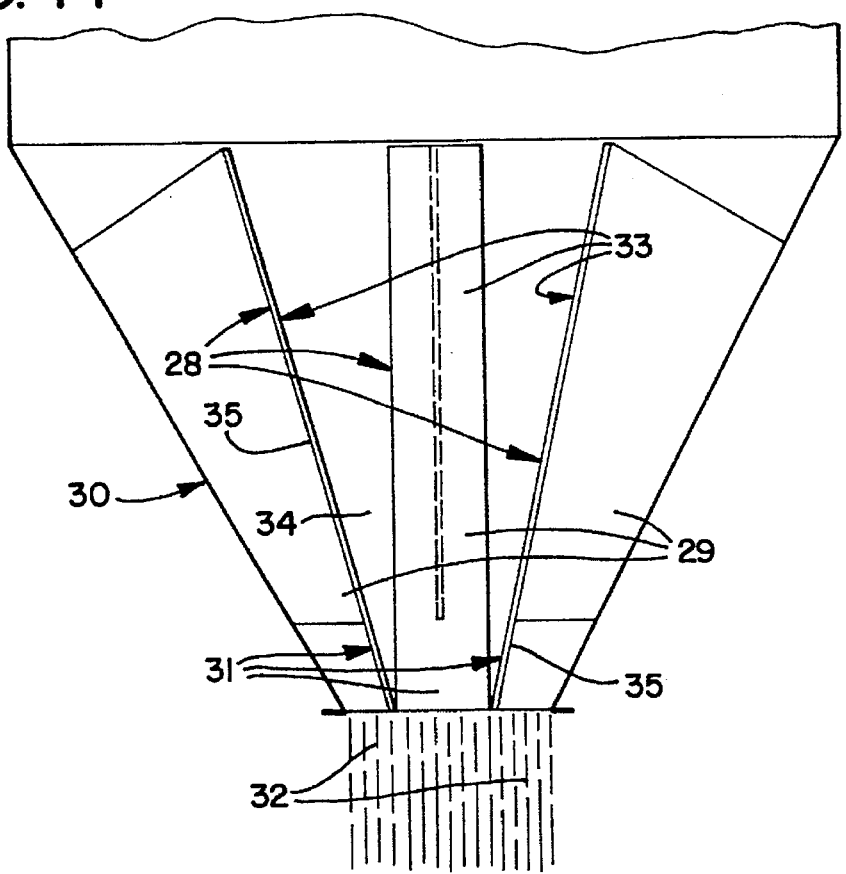
FIG. 11 shows the insert members of the present invention installed within a conical hopper.

FIG. 11 shows front and side elevation views of insert members (28) with supports, (29) to suit a conical form of hopper (30). The lower portion of the insert surface (31) projects over the 'drawdown' region of the hopper outlet (32), that is the outlet area over which material is extracted during the discharge process.

The assembly of inclined members (28) is designed in relation to the geometry of the container and the frictional properties of the bulk material on the contact surface of the hopper walls. These inserts form support surfaces internal to the hopper (33) on which the bulk material will slip during flow. The upper facing surface of the inserts form a discontinuous support surface for material held in the central region of the hopper (34). These faces have the effect of providing a partial Mass Flow form of hopper on which the central contents of the hopper will slide.

The underside of the insert members (35) provide regions shielded from the outward acting pressure from the central section. The outlying material is separately extracted from the outlet by sliding down the local outer walls. The flow of material from under the inserts offers sections of reduced radial pressure for the outlying contents of the container cross section. The adjacent outlying regions may then slide down the local converging faces of the hopper, because the relaxation of confining pressure at 90° to the direction of movement allows the bulk material to deform and flow more easily.

In hoppers of conical shape the invention gives the following beneficial effects:
Reduction of wall friction on the main hopper walls.

The radially pressure acting on the wall is reduced by the shielding provided by the inserts and the shear strength of the bulk material transferring stress from the material in the central region of the hopper which is supported by the inserts. Frictional forces between the stored material and the outer wall of the hopper are correspondingly reduced, both under the inserts and in the spaces between them by virtue of the reduced wall contact pressures.
Reduction of circumferential pressure on material in the outer regions of the hopper.

Material in the outer regions of the hopper which is caused to move downwards in the hopper experiences regions of reduced circumferential pressure in the periphery due to the shielding of the inserts. This effect allows the material to reduce in diameter more easily by relaxing regions of the hoop stress normally resisting flow in a converging channel.
Reduction of radial pressure on material in the outer regions of the hopper.

The regions of reduced pressure under the inserts also provides an escape flow route for the adjacent central disposed material to move out and down the shielded flow path. The adjacent wall support of the inserts for the central region transfers supporting stress to the adjacent regions between the inserts and so reduce the pressure acting outwards on the material in the outlying annulus of the hopper. This reduction of outward acting forces reduces the confining pressures and allows the material in the outer regions to deform more easily as it moves to a lower position in the hopper.

The contribution of these factors, to ease wall slip and deformation of the material in the hopper, permits Mass Flow to take place at lower hopper wall inclinations than if the inserts were not fitted.
Design Variants.

Figure 12:
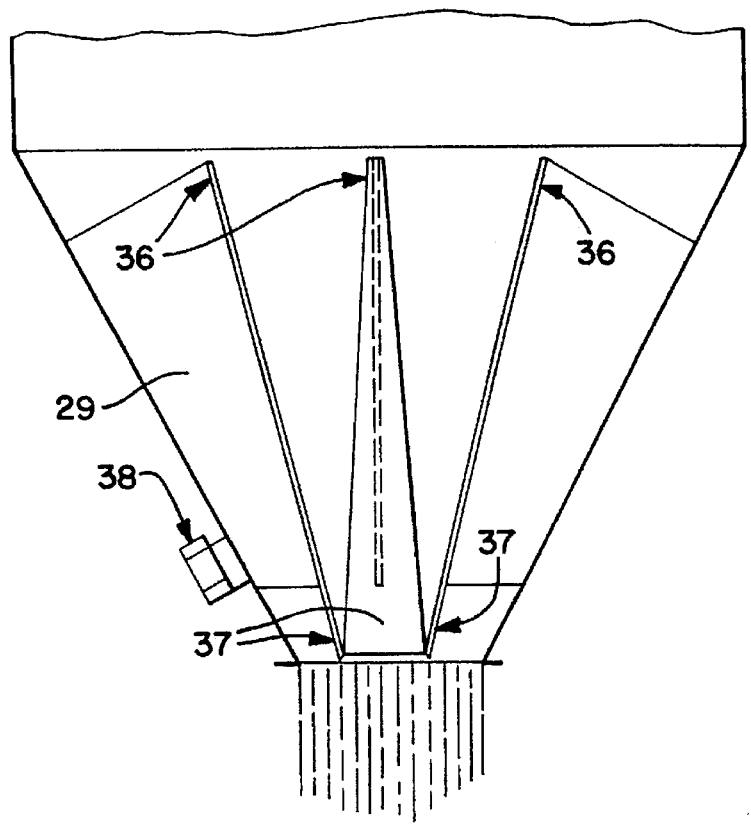
FIG. 12 shows tapered insert members installed within a hopper and a vibrator attached to the hopper.

A design option is to vary the width of the insert members, from narrow at the top (36) to wider at lower positions in the hopper (37), FIG. 12. The increase in area under the inserts offers a progression in the degree of radial shielding to the regions nearest the wall at differing heights within the container. The number of inserts used in a hopper may also be varied according to the geometry of the installation. Differing materials of construction, or coating of the inner face of the inserts, may also be used to secure optimum designs, according to the properties of the bulk material being handled and to suit applications at differing scales of installation.

Figure 17:
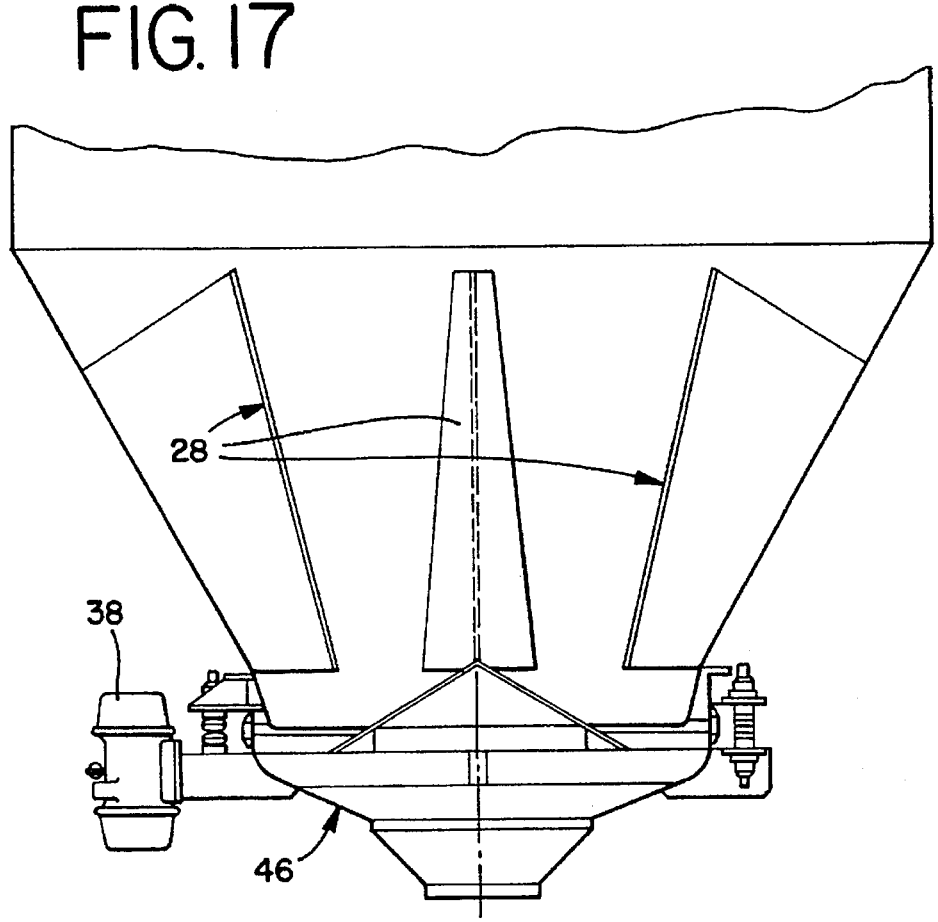
FIG. 17 shows a bin activator attached to a hopper having insert members.
Figure 18:
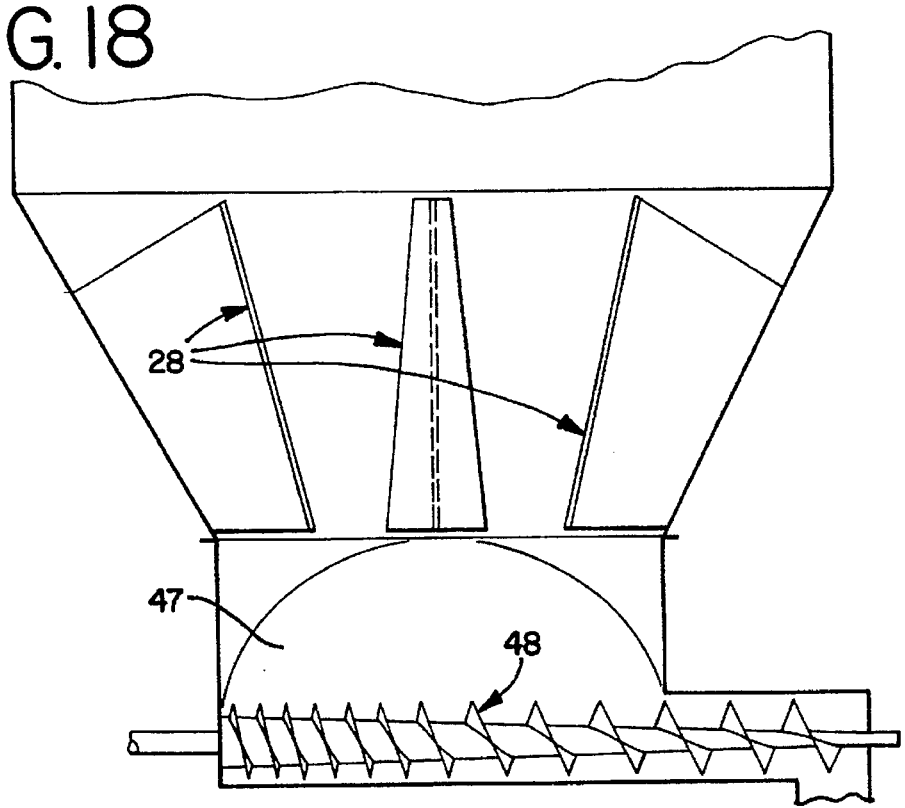
FIG. 18 shows a hopper having a mass flow chisel section with an extraction screw feeder attached below the hopper.

A further variant is the provision of a vibrator 38 to the outside of the container. This should preferably, but not essentially, be mounted in line with the supporting members to the insert. The construction of the insert is such that the lower section of the inserts overhanging the supports may be tuned by design, to vibrate in natural synchronism with the frequency of the vibrator. As a consequence the extended tips 37 of the inserts oscillate in resonance to provide a disturbing mechanism to counter the tendency for the bulk material to form a flow obstructive 'arch' or 'bridge' across the small span of the flow opening between the insert members, as shown in FIG. 17.

An additional effect of the vibration is to cause a lowering of the frictional forces resisting slip on both the insert member and on the container wall and also to assist the deformation of bulk material in contact with the surfaces influenced by the vibration by applying disturbing forces to the bulk.

Figure 13:
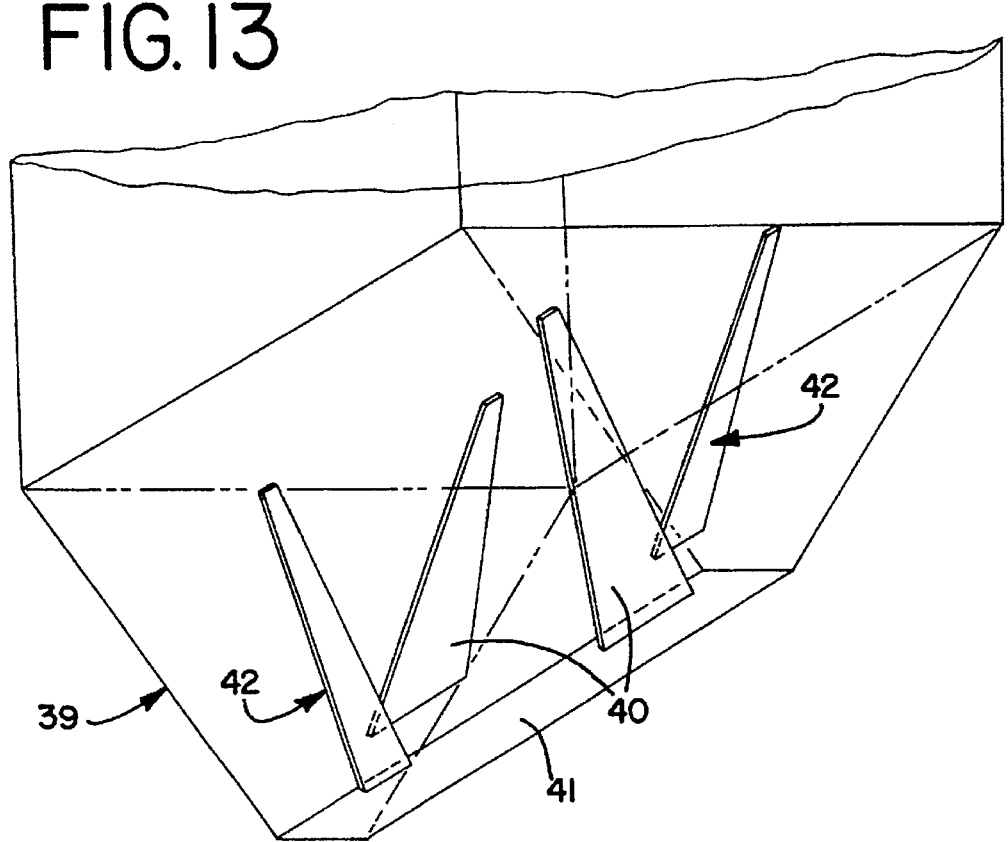
FIG. 13 shows the insert members of the present invention installed within a V-shaped hopper.

An arrangement for applications to Vee shaped hoppers (39) is that the inserts (40) are fitted in an alternating arrangement on each side of the inclined hopper faces, whereby they overlap the discharge slot (41) and are spaced to provide a gap between the members, as in FIG. 13. Inserts in the form of reduced width members may also be fixed against the end faces of the Vee hoppers (42) to provide side relaxation of deformation stresses arising from convergence of the flow channel.

Figure 14:
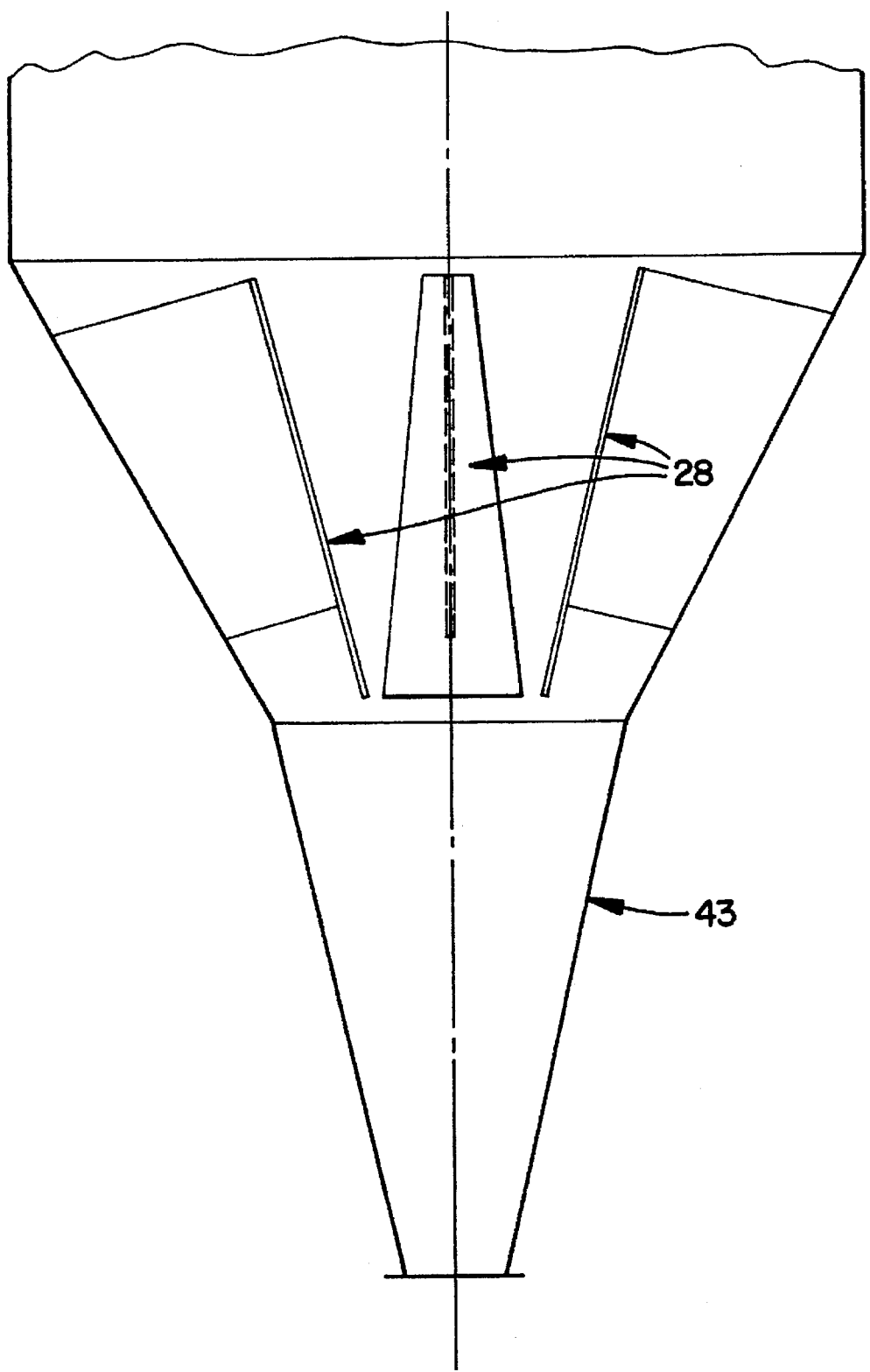
FIG. 14 shows a mass flow hopper attached to a hopper with insert members.

The design of the basic conical or Vee shaped hopper may be of a two stage form with a conventional mass flow design for the lower region (43) up to a diameter at which the flow channel has expanded sufficiently to draw from under the inserts, shown in FIG. 14.

Figure 15:
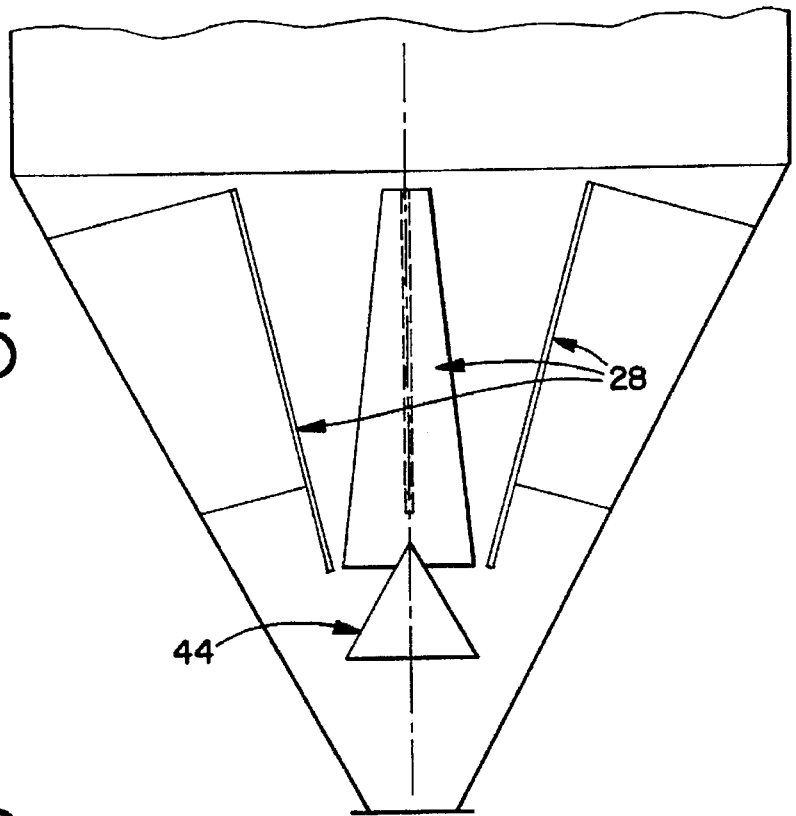
FIG. 15 shows an inverted cone deflector member positioned within a hopper having insert members.
Figure 16:
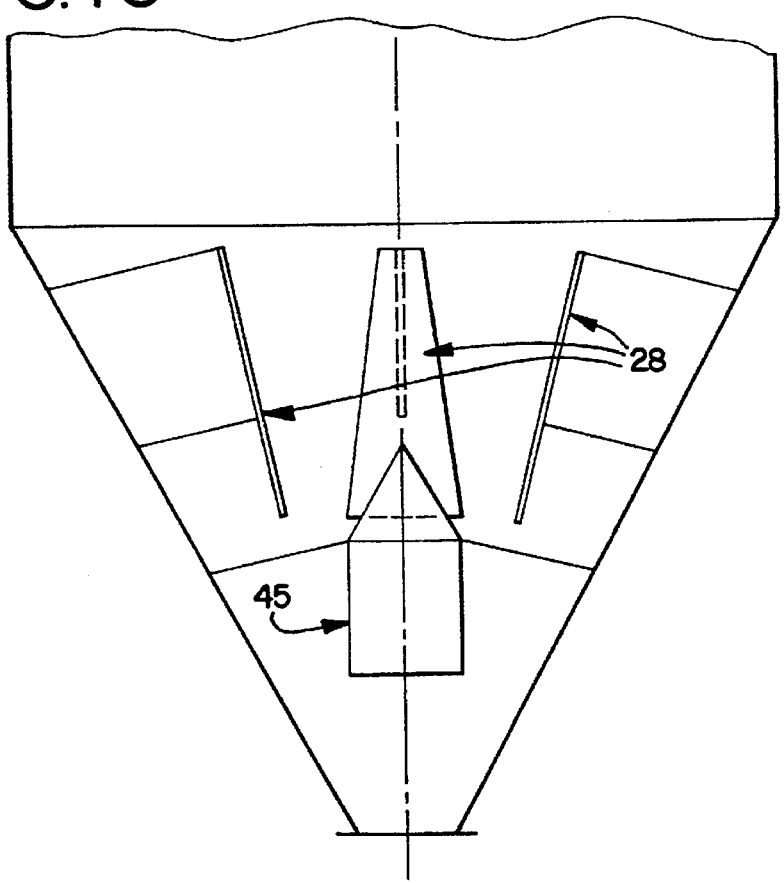
FIG. 16 shows an inverted cone and cylinder deflector member installed within a hopper having insert members.

Further options for expanding the flow from the hopper outlet region, to suit the drawdown characteristics of the invention, take the form of an inverted cone, (44) or inverted cone and cylinder type inserts (45) of established forms, in order to provide preferential extraction from under the insert members, shown in FIGS. 15 and 16.

Various forms of feeders and discharge devices may also be employed to provide a sufficiently large out size to satisfy the hopper outlet flow channel requirements. One such device is a vibrated Bin Activator (46) as shown in FIG. 17. A Chisel Shaped Mass Flow hopper (47) and Screw Feeder with continuous extracting characteristics over the length of the outlet slot, (48) may alternatively be used. Suitably designed Belt Feeders or Vibratory Feeders may also be employed in conjunction with the insert members.

It is a requirement of such associated extraction devices that they cause material to be extracted from the regions under the inserts described.

I claim:

1. An insert system adapted for positioning within a hopper having a wall and an outlet, said insert system comprising:

an elongate flow deflector having a top end, a bottom end, a first edge, a second edge and a support surface, said first and second edges extending between said top end and said bottom end of said flow deflector, said flow deflector having a length extending along said support surface between said top end and said bottom end and a width extending along said support surface between said first edge and said second edge, said length being substantially longer than said width; and a support member attached to said flow deflector, said .support member adapted to be attached to the wall of the hopper to support said flow deflector in a spaced relation to the wall of the hopper such that said flow deflector forms a flow region located between said flow deflector and the wall of the hopper, said flow deflector adapted to promote a mass flow pattern of the hopper contents.

2. The insert system of claim 1 wherein said support member includes a first end adapted to space said top end of said flow deflector a first distance from the wall of the hopper and a second end adapted to space said bottom end of said flow deflector a second distance from the wall of the hopper, said first distance being longer than said second distance.

3. The insert system of claim 1 wherein said bottom end of said flow deflector is adapted to be located generally vertically above the outlet of the hopper.

4. The insert system of claim 1 wherein said support surface of said flow deflector has a first width at said top end and a second width at said bottom end, said second width being wider than said first width.

5. The insert system of claim 1 wherein said support surface is generally V-shaped.

6. The insert system of claim 1 including a plurality of flow deflectors adapted to be respectively attached to the wall of the hopper by a plurality of support members.

7. The insert system of claim 1 wherein said flow deflector includes a low-friction liner which forms said support surface.

8. The insert system of claim 1 wherein said bottom end of said flow deflector includes an overhung tip which extends in a cantilevered manner from said support member.

9. The insert system of claim 1 wherein said first edge and said second edge of said support surface converge towards one another as said edges extend from said top end to said bottom end of said deflector member.

10. The insert system of claim 1 wherein said support member is attached to said flow deflector along a substantial portion of said length of said flow deflector between said top end and said bottom end.

11. The insert system of claim 1 wherein said support member comprises a generally planar member extending generally perpendicularly from said flow deflector.

12. A hopper for the bulk storage of particulate material, said hopper including:

one or more walls forming an outlet;

a plurality of elongate flow deflectors, each said flow deflector including a first edge, a second edge, a top end, a bottom end, and a support surface, said first and second edges extending between said top end and said bottom end of said flow deflector, each said flow deflector having a length extending along said support surface between said top end and said bottom end and a width extending along said support surface between said first edge and said second edge, said length being substantially longer than said width; and a plurality of support members, each said support member being attached to a respective flow deflector and to said one or more walls such that each said flow deflector is spaced apart from said one or more walls, thereby forming a flow region between said flow deflector and said one or more walls, said flow deflectors being spaced apart from one another along said one or more walls;

whereby said plurality of flow deflectors are adapted to promote a mass flow pattern of the hopper contents.

13. The hopper of claim 12 wherein said top end of at least one of said flow deflectors is spaced farther from said wall to which said flow deflector is attached than is said bottom end of said flow deflector.

14. The hopper of claim 12 wherein said bottom ends of said flow deflectors are located generally vertically above said outlet of said hopper.

15. The hopper of claim 12 wherein said support surface of at least one of said flow deflectors has a first width at said top end and a second width at said bottom end, said second width being wider than said first width.

16. The hopper of claim 12 wherein at least one of said support surfaces is generally V-shaped.

17. The hopper of claim 12 wherein at least one of said flow deflectors includes a low-friction liner which forms said support surface.

18. The hopper of claim 12 wherein said bottom end of at least one of said flow deflectors includes an overhung tip which extends in a cantilevered manner from said support member that is attached to said at least one of said flow deflectors.

19. The hopper of claim 18 including a vibrator associated with said at least one of said flow deflectors, said vibrator adapted to vibrate said overhung tip to apply a disturbing force to the contents of the hopper.

20. A hopper for the bulk storage of particulate material, said hopper including:

a first wall, a second wall opposing said first wall, said first wall and said second wall forming an outlet;

a plurality of flow deflectors, each said flow deflector having a top end, a bottom end, and a support surface; and a plurality of support members, each said support member being attached to a respective flow deflector and to one of said first and second walls such that each said flow deflector is in a spaced relation to said one of said first and second walls, said plurality of flow deflectors being respectively alternately attached to said first and second walls;

whereby said flow deflectors are adapted to provide a mass flow pattern of the hopper contents.

* * * * *

UNITED STATES PATENT AND TRADEMARK OFFICE
CERTIFICATE OF CORRECTION

PATENT NO. : 5,651,479
DATED : July 29, 1997
INVENTOR(S) : Lyndon Bates

It is certified that error appears in the above-indentified patent and that said Letters Patent is hereby corrected as shown below:

In the Abstract, at line 3, delete "smile" and insert --static--.

At Column 6, line 65, delete ".".

Signed and Sealed this

Twenty-first Day of October 1997

Attest:

BRUCE LEHMAN

Attesting Officer     Commissioner of Patents and Trademarks